US008867997B2

(12) United States Patent
Uefuji et al.

(10) Patent No.: US 8,867,997 B2
(45) Date of Patent: Oct. 21, 2014

(54) SHORT-RANGE COMMUNICATION SYSTEM, IN-VEHICLE APPARATUS, AND PORTABLE COMMUNICATION TERMINAL

(75) Inventors: Takashi Uefuji, Chiryu (JP); Hiroki Ukai, Nagoya (JP)

(73) Assignee: Denso Corporation, Kariya (JP)

( * ) Notice: Subject to any disclaimer, the term of this patent is extended or adjusted under 35 U.S.C. 154(b) by 242 days.

(21) Appl. No.: 13/489,858

(22) Filed: Jun. 6, 2012

(65) Prior Publication Data
US 2013/0005258 A1    Jan. 3, 2013

(30) Foreign Application Priority Data

Jun. 28, 2011    (JP) .................................. 2011-142835

(51) Int. Cl.
| | |
|---|---|
| H04B 5/00 | (2006.01) |
| G06F 9/48 | (2006.01) |
| H04M 1/725 | (2006.01) |
| H04L 29/08 | (2006.01) |
| H04W 4/00 | (2009.01) |
| H04W 76/04 | (2009.01) |
| H04M 1/60 | (2006.01) |
| H04W 88/02 | (2009.01) |
| H04W 84/08 | (2009.01) |

(52) U.S. Cl.
CPC .............. H04L 67/10 (2013.01); H04W 4/008 (2013.01); H04W 76/041 (2013.01); G06F 9/4856 (2013.01); H04M 1/72527 (2013.01); H04M 2250/02 (2013.01); H04L 67/2861 (2013.01); H04M 1/6075 (2013.01); H04L 67/12 (2013.01); H04W 88/02 (2013.01); H04W 84/08 (2013.01)
USPC ....... 455/41.2; 455/550.1; 455/566; 455/567; 455/575.1; 455/347; 455/351; 455/569.2; 455/345; 455/414.1; 455/552.1

(58) Field of Classification Search
USPC .......... 455/41.2, 550.1, 566, 567, 575.1, 347, 455/351, 569.2, 345
See application file for complete search history.

(56) References Cited

U.S. PATENT DOCUMENTS

| | | | | |
|---|---|---|---|---|
| 2003/0065440 | A1* | 4/2003 | Oda et al. ...................... | 701/202 |
| 2003/0156097 | A1* | 8/2003 | Kakihara et al. .............. | 345/156 |

(Continued)

FOREIGN PATENT DOCUMENTS

| | | |
|---|---|---|
| CN | 1409087 | 4/2003 |
| JP | 2007-74265 | 3/2007 |

(Continued)

OTHER PUBLICATIONS

Office action dated Jun. 4, 2013 in corresponding Japanese Application No. 2011-142835.
Office action dated Feb. 27, 2014 in corresponding Chinese Application No. 2012 1022448.2.
Office action dated Dec. 3, 2013 in corresponding Japanese Application No. 2011-142835.
Office action dated Aug. 1, 2014 in corresponding Chinese Application No. 2012 10224448.2.

*Primary Examiner* — Ganiyu A Hanidu
(74) *Attorney, Agent, or Firm* — Harness, Dickey & Pierce, PLC

(57) ABSTRACT

A short-range communication system includes a portable communication terminal and an in-vehicle apparatus communicatively connected to the portable communication terminal. When connection is established between the portable communication terminal and the in-vehicle apparatus, a content is executed in the in-vehicle apparatus. When the connection therebetween is released while the content is being executed in the in-vehicle apparatus, the portable communication terminal executes the content by taking over an application execution state of the in-vehicle apparatus which is transmitted from the in-vehicle apparatus.

14 Claims, 11 Drawing Sheets

(56) References Cited

U.S. PATENT DOCUMENTS

| | | | |
|---|---|---|---|
| 2004/0185842 A1* | 9/2004 | Spaur et al. | 455/420 |
| 2009/0221271 A1* | 9/2009 | Soma et al. | 455/414.1 |
| 2010/0138149 A1 | 6/2010 | Ohta et al. | |
| 2010/0234071 A1* | 9/2010 | Shabtay et al. | 455/562.1 |

FOREIGN PATENT DOCUMENTS

| | | |
|---|---|---|
| JP | 2010-081419 | 4/2010 |
| JP | 2010-130669 | 6/2010 |
| JP | 2010-279042 | 12/2010 |

* cited by examiner

SHORT-RANGE COMMUNICATION SYSTEM, IN-VEHICLE APPARATUS, AND PORTABLE COMMUNICATION TERMINAL

CROSS REFERENCE TO RELATED APPLICATION

This application is based on Japanese Patent Application No. 2011-142835 filed on Jun. 28, 2011, the disclosure of which is incorporated herein by reference.

TECHNICAL FIELD

The present disclosure relates to a short-range communication system, an in-vehicle apparatus, and a portable communication terminal. The short-range communication system includes the in-vehicle apparatus and the portable communication terminal communicatively connected to the in-vehicle apparatus. The portable communication terminal and the in-vehicle apparatus each have a content execution section to execute a content acquired in the portable communication terminal. While the connection therebetween has been established, the content is executed in the in-vehicle apparatus.

BACKGROUND

[Patent Document 1] JP 2007-74265 A

There is known a system that includes a portable communication terminal connected to an external communication network as a communication medium. In the system, a content acquired by the portable communication terminal is executed in a different apparatus connected to the portable communication terminal by a short-range communication. For example, Patent Document 1 discloses a technology in which a content is acquired by using a mobile phone as a terminal, and displaying of information about the content is executed by a personal computer having a large display.

By the way, when apparatuses connected by a short-range communication have equivalent functions as in Patent Document 1, contents are considered to be executed in only one apparatus to reduce power consumption in another apparatus. For example, when a connection party of a portable communication terminal is an in-vehicle apparatus, the portable communication terminal is used only as a communication medium to acquire a content from an external communication network while the connection of the portable communication terminal to the in-vehicle apparatus has been established. The acquired content is executed in the in-vehicle apparatus. Therefore, when power of a vehicle is turned off or when a user gets out of the vehicle, a short-range communication between the portable communication terminal and the in-vehicle apparatus is released to thereby stop the execution of contents.

However, for example, when a content such as the so-called Internet radio and music delivery is being executed, some users want to continue executing the content on their portable communication terminals after getting off the vehicles. In that case, in the above structure, the user may need to operate the portable communication terminal after leaving the vehicle to reboot an application program and to acquire a desired content again, reducing the convenience.

SUMMARY

The present disclosure is accomplished in view of the above-mentioned circumstances. It is an object of the present disclosure is to provide a short-range communication system, an in-vehicle apparatus, and a portable communication terminal in which, before and after the connection between the portable communication terminal and the in-vehicle apparatus, contents can be executed continuously to improve the convenience.

To achieve the above object, according to a first example of the present disclosure, a short-range communication system is provided as follows. The system includes a portable communication terminal including a content execution section to execute a content, and an in-vehicle apparatus, which includes a content execution section to execute a content and is communicatively connected to the portable communication terminal. The content execution section of the in-vehicle apparatus executes a content in cooperation with the portable communication terminal in a state where connection between the portable communication terminal and the in-vehicle apparatus is established. The in-vehicle apparatus further includes a notification device that transmits an application execution state in the content execution section of the in-vehicle apparatus, to the portable communication terminal. The content execution section of the portable communication terminal executes a content by taking over the application execution state in the in-vehicle apparatus, the application execution state being transmitted from the notification device of the in-vehicle apparatus in cases that the connection between the portable communication terminal and the in-vehicle apparatus is released during execution of the content in the content execution section of the in-vehicle apparatus.

As a result, for example, even when a user in the vehicle gets off the vehicle to release the connection between the portable communication terminal and the in-vehicle apparatus, the user does not need to reboot an application that executes a content or to acquire the content again. This can improve the convenience.

Further, according to a second example of the present discloser, a short-range communication system is provided as follows. The system includes a portable communication terminal acquiring a content and including a content execution section to execute the content, and an in-vehicle apparatus communicatively connected to the portable communication terminal, the in-vehicle apparatus including a content execution section to execute a content that is acquired by the portable terminal. The content execution section of the in-vehicle apparatus executes the content in a state where connection between the portable communication terminal and the in-vehicle apparatus is established. The portable communication terminal further includes a notification device that transmits an application execution state in the content execution section of the portable communication terminal, to the in-vehicle apparatus. Herein, in cases that connection to the portable communication terminal is established in a state where the content is being executed by the content execution section of the portable communication terminal, the in-vehicle apparatus executes the content by taking over the application execution state in the portable terminal which is transmitted from the notification device of the portable communication terminal.

When the user who is executing a content, e.g., in the portable communication terminal gets on the vehicle, the content is continuously executed in the in-vehicle apparatus even when the user does not operate the content. This can improve the convenience.

Further, according to a third example of the present disclosure, an in-vehicle apparatus is provided as being used in the short-range communication system of the above first or second example.

Yet further, according to a fourth example of the present disclosure, a portable communication terminal is provided as being communicatively connected to an in-vehicle apparatus having (i) a content execution section that executes a content and (ii) a notification device that transmits an application execution state in the content execution section. The portable communication terminal includes a content execution section that executes a content by taking over an application execution state in the in-vehicle apparatus which is transmitted from the notification device of the in-vehicle apparatus when connection between the portable communication terminal and the in-vehicle apparatus is released in a state where the content is being executed in the in-vehicle apparatus.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

Figure 1:
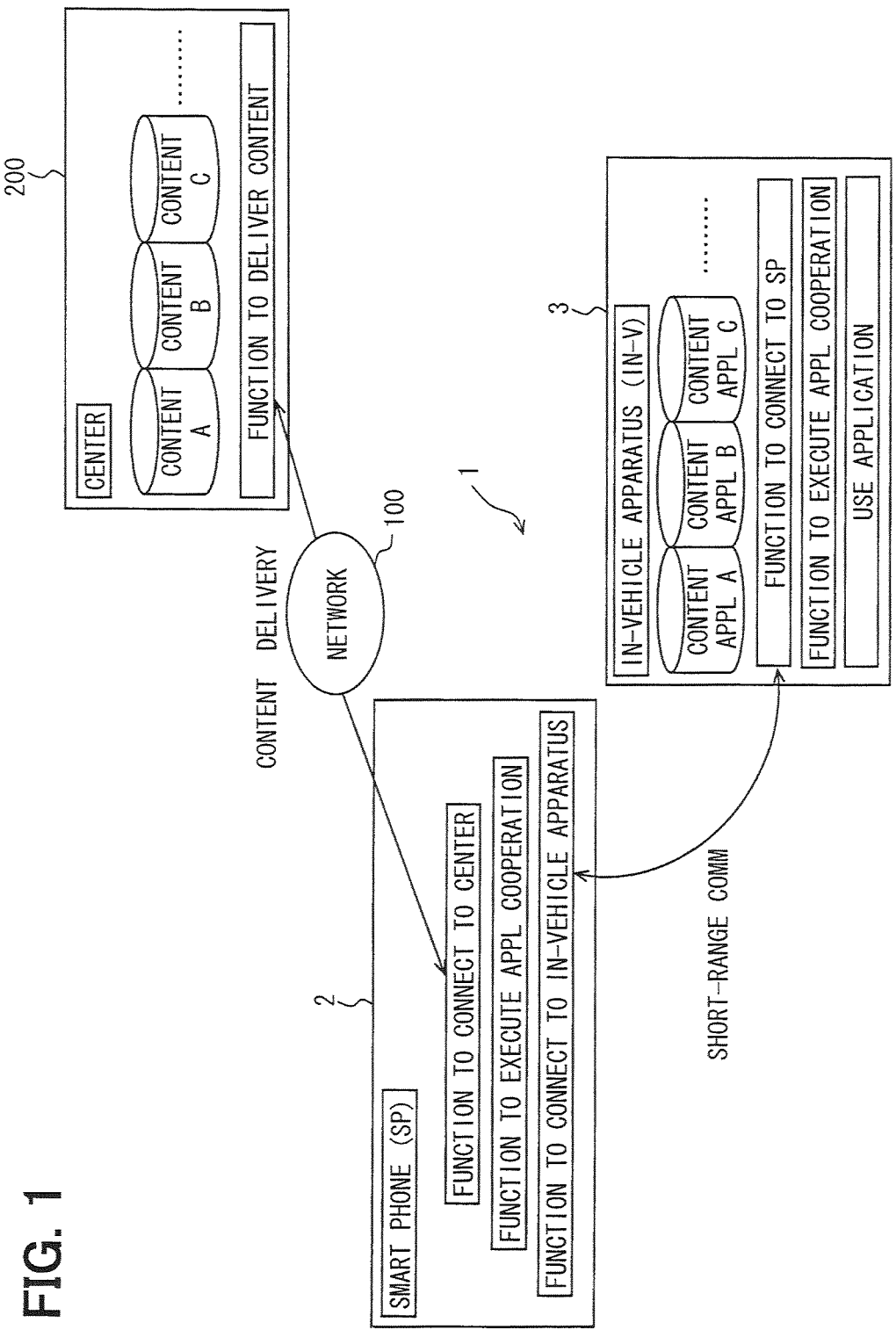
FIG. 1 schematically shows an overall structure of a short-range communication system of a first embodiment of the present disclosure.

Hereafter, embodiments of a short-range communication system of the present disclosure are described in reference to the drawings. In the following embodiments, the substantially same components are indicated by the same reference numerals, and the detailed explanation is not repeated. In the following, Bluetooth (registered trademark) is referred to as BT.

(First Embodiment)

A short-range communication system of a first embodiment is explained in reference to FIGS. 1 to 10.

As shown in FIG. 1, the short-range communication system 1 is provided with a portable communication terminal 2 and an in-vehicle apparatus 3 as a vehicular apparatus. In this embodiment, it is assumed that the portable communication terminal 2 is a so-called smart phone. The portable communication terminal 2 acquires contents delivered from a center-side apparatus provided to an external center 200 via a communication network 100. The center-side apparatus stores various contents of data delivered by the so-called Internet radios and music delivery or search services, such as contents A to C, and delivers contents in response to delivery requests from the portable communication terminal 2.

Figure 2:
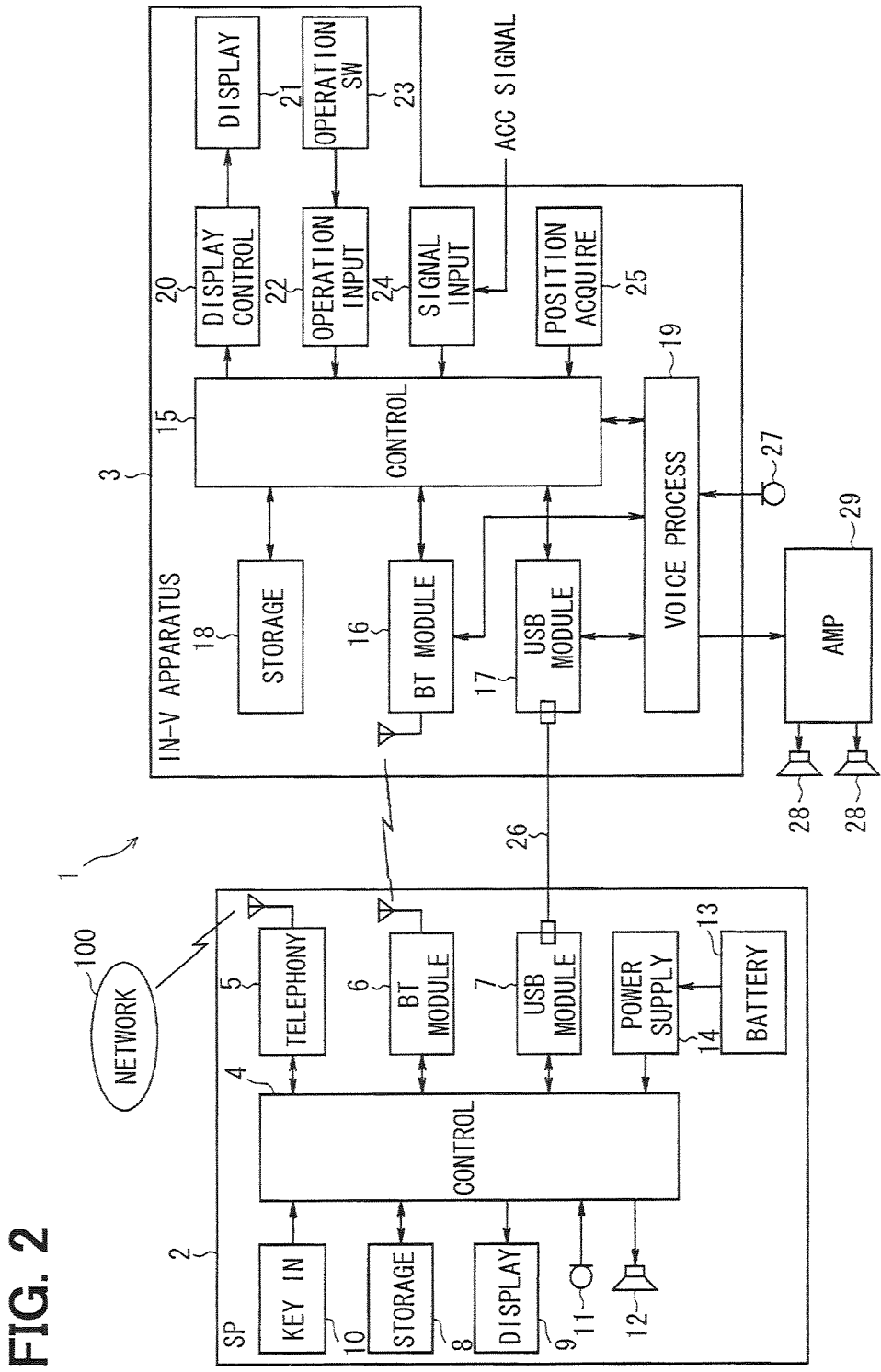
FIG. 2 shows a schematic diagram of an in-vehicle apparatus and a portable communication terminal.

The portable communication terminal 2 shown in FIG. 2 includes a terminal control circuit 4, a telephony portion 5, a BT module 6, a USB (Universal Serial Bus) module 7, a storage portion 8, a display portion 9, a key input portion 10, a microphone 11, a speaker 12, a power supply portion 14 connected to a bate 3, etc. In this embodiment, the so-called smart phone 2 is assumed to be the portable communication terminal 2. The terminal control circuit 4 includes a well-known microcomputer having a CPU, a RAM, a ROM, an I/O bus, etc. that are not shown. The terminal control circuit 4 controls overall operations of the portable communication terminal 2, such as communications, data management, and acquisition and execution of contents mentioned later, on the basis of computer programs stored in, e.g., the ROM or the storage portion 8. The terminal control circuit 4 includes a content execution section, device, or means. In this embodiment, the content execution section of the portable communication terminal 2 may be realized in a software manner by computer programs executed by the terminal control circuit 4.

The telephony portion 5 executes telephone communications with a communication network 100. In this case, the communication network 100 includes facilities that provide mobile phone communication services using the known public network, such as mobile phone stations and station control apparatuses. The telephony portion 5 functions also as a content acquisition device or means to acquire various contents such as tunes and images (including videos) from a server (not shown) connected to the communication network 100.

The BT module 6 executes BT communication (also referred to as a short-range wireless communication) with the in-vehicle apparatus 3 via a BT communication line. The BT module 6 allows simultaneous connection (multi connection) of multiple profiles defined by the BT telecommunication standard. The multiple profiles signify communication profiles defined for respective functions. In this case, the BT module 6 communicates information about types of contents and operations to contents (for example, executions, stops, and selections of contents) as execution states of applications with the in-vehicle apparatus 3.

In this case, the information communicated as an application execution state includes information about an execution state of a content, such as a type of a tune and an already played time of a tune, or information about operations such as fast forward and pause of a tune, for example, when the content is a music content. Further, the information communicated as an application execution state includes an execution state of an application itself, such as a type of an application program being activated to execute a content (e.g., a tune play application and a web browser), activation and pause of the application program, and an application program selected by a user. That is, an execution state of an application includes various information inputted by a user when a desired content is executed. The BT module 6 is connectable to, e.g., a hands-free microphone not shown. The BT module 6 of the portable communication terminal 2 forms a notification device or means.

The USB module 7 communicates data with the in-vehicle apparatus 3 via a USB communication line. The storage portion 8 has a storage region to store various data including the above computer program, acquired contents, and application programs that execute the contents. The storage portion 8 may be detachably structured by a memory card etc. The display portion 9 includes a liquid crystal display and an organic electroluminescence display to display various information on the basis of display instruction signals of the terminal control circuit 4. The display portion 9 displays a well-known telephone directory, received mails, information about acquired contents, an operation screen for contents, etc.

The key input portion 10 has various operation keys (not shown) including a touch switch (that is, a touch panel) provided on the screen of the display portion 9 and switches provided around and near the display portion 9. The touch switch uses a well-known pressure-sensitive type, electromagnetic induction type, capacitive type, or the combinations thereof. The key input portion 10 outputs an operation detection signal to the terminal control circuit 4 in response to an operation of an operation key by the user. The terminal control circuit 4 analyzes the operation detection signal inputted from the key input portion 10 to identify the operation by the user, and transmits this identified operation to the in-vehicle apparatus 3, which is the connection party, via the BT communication. The key input portion 10 is equivalent to an operation input device or means.

The microphone 11 inputs voice of the user as transmitted voice. The speaker 12 outputs voice received from a call partner by the telephony portion 5 as received sound. The speaker 12 also outputs voice data contained in the above content that is being executed. The battery 13 is removable from a main body of the portable communication terminal 2. The power supply portion 14 supplies electric power to each function portion such as the terminal control circuit 4 by use of the power of the battery 13 as operation power.

The in-vehicle apparatus 3 is provided with an apparatus control circuit 15, a BT module 16, a USB module 17, a storage portion 18, a voice process portion 19, a display control circuit 20, a display portion 21, an operation input portion 22, an operation switch 23, a signal input portion 24, a position acquisition portion 25, etc. In this embodiment, the in-vehicle apparatus 3 is mounted in a compartment of a vehicle. The apparatus control circuit 15 of the in-vehicle apparatus 3 includes a well-known microcomputer having a CPU, RAM, ROM, I/O bus, etc. that are not shown. The apparatus control circuit 15 controls overall operations of the in-vehicle apparatus 3, such as communications and data management on the basis of computer programs stored in the ROM or the storage portion 18. The apparatus control circuit 15 executes contents acquired by the portable communication terminal 2. The apparatus control circuit 15 forms a content execution section, device, or means. The content execution section of the in-vehicle apparatus 3 may be realized in a software manner by a computer program executed by the apparatus control circuit 15.

The BT module 16 executes data communications with the portable communication terminal 2 via the BT communication line. Specifically, the BT module 16 executes transmission and reception of contents acquired by the portable communication terminal 2, reception of operations to contents inputted by the portable communication terminal 2, and transmission (notification) of execution states of contents in the in-vehicle apparatus 3 and operations inputted from the operation input portion 22 to the portable communication terminal 2. The BT module 16 forms a notification device or means together with the apparatus control circuit 15.

The USB module 17 is connected to the portable communication terminal 2 via a connection cable 26, and executes data communications with the portable communication terminal 2 via the USB communication line. The storage portion 18 includes a non-volatile storage such as a hard disk drive to store, e.g., various programs such as the above computer programs and application programs and data used in each program. The application programs include also application programs to execute contents. The storage portion 18 may be built in the in-vehicle apparatus 3 or use an outer storage detachable from the in-vehicle apparatus 3.

The voice process portion 19 is connected to an audio amplifier 29 having a microphone 27 and a speaker 28. The voice process portion 19 is connected to the apparatus control circuit 15, BT module 16, and USB module 17. The voice process portion 19 executes a well-known voice input process and a well-known voice output process. Specifically, the microphone 27 is placed, e.g., near a steering wheel in the compartment to easily collect voice of the user. The audio amplifier 29 is provided outside the in-vehicle apparatus 3 and in the compartment. The voice process portion 19 outputs, e.g., instructions of operations of the in-vehicle apparatus 3 on the basis of voice inputted from the microphone 27. The voice process portion 19 outputs voice from the speaker 28 on the basis of instructions from the apparatus control circuit 15, the BT module 16, etc. In this embodiment, the speaker 28 is a so-called stereo speaker.

The display control circuit 20 is connected to the display portion 21 to control a display content or a display screen on the display portion 21 on the basis of instructions from the apparatus control circuit 15. The display portion 21 includes a liquid crystal display or an organic electroluminescence display, and displays various information on the basis of display instruction signals of the display control circuit 20. The display portion 21 is provided, on its screen, with a touch switch (the so-called touch panel). The touch switch uses a well-known pressure-sensitive type, electromagnetic induction type, capacitive type, or the combinations thereof. The display portion 21 displays, e.g., an operation screen to input operations of the in-vehicle apparatus 3, and as described later, to input an execution state of a content and operations to the content.

The operation input portion 22 is connected to the operation switch 23 having multiple switches provided around the display portion 21. The operation input portion 22 detects operations of the touch panel and operations of the operation switch 23 by the user, and outputs the operation detection signal to the apparatus control circuit 15. Specifically, when the user operates the touch switch and the operation detection signal is inputted from the operation switch 23, the operation input portion 22 outputs the inputted operation detection signal to the apparatus control circuit 15. The apparatus control circuit 15 analyzes the operation detection signal inputted from the operation input portion 22 to identify the operation by the user. When the operation detection signal is inputted from the operation input portion 22, the apparatus control circuit 15 outputs a display instruction signal to the display control circuit 20 on the basis of the identified operation content. Then, the apparatus control circuit 15 transmits the operation content to the portable communication terminal 2 which is the apparatus of the connection party via the BT module 6 by the BT communication.

The signal input portion 24 is connected to an accessory (ACC) switch which is mounted to the vehicle but which is not illustrated. When an ACC signal outputted from the ACC switch is inputted to the signal input portion 24, the signal input portion 24 outputs the ACC signal to the apparatus control circuit 15. The apparatus control circuit 15 turns on and off a power circuit not illustrated on the basis of on-off of the ACC signal outputted from the signal input portion 24.

That is, the apparatus control circuit 15 turns on the power circuit (activates the in-vehicle apparatus 3) at the time that the ACC signal changes from off to on, and turns off the power circuit (stops the in-vehicle apparatus 3) at the time when the ACC signal changes from on to off. A microcomputer different from the apparatus control circuit 15 may be provided to turn on and off the power circuit.

The position acquisition portion 25 is provided with a geomagnetic sensor, a gyroscope, a speed sensor, a GPS receiver, etc. that are well known but not illustrated. The position acquisition portion 25 acquires positional information on a vehicle by making complement each other the detection signals inputted from the geomagnetic sensor, gyroscope, speed sensor, GPS receiver, etc. In this case, when the position acquisition portion 25 can acquire the positional information about a vehicle at a required detection accuracy, all the sensors are not required. The sensors may be structured together with, e.g., a steering sensor that detects a steering angle and a wheel sensor that detects rotation of each wheel (neither of which is illustrated). The position acquisition portion 25 outputs acquired positional information about a host vehicle to the apparatus control circuit 15. The apparatus control circuit 15 executes a navigation process on the basis of the positional information acquired by the position acquisition portion 25. That is, in this embodiment, a navigation apparatus is used as the in-vehicle apparatus 3.

In the short-range communication system 1, when the connection between the portable communication terminal 2 and the in-vehicle apparatus 3 is not established, that is, when the connection by the BT communication is not established, each operates independently. That is, when the connection therebetween is not established, a content acquired by the portable communication terminal 2 is executed by an application program executed by the terminal control circuit 4 of the portable communication terminal 2.

Next, action of the above short-range communication system 1 is explained in reference to FIGS. 3 to 10. Hereafter, the portable communication terminal 2 is also called a SP (smart phone) and an application program is also called just an application. The following processes are executed by the terminal control circuit 4 in the portable communication terminal 2 and by the apparatus control circuit 15 in the in-vehicle apparatus 3. For brief explanation, the portable communication terminal 2 and the in-vehicle apparatus 3 are mainly explained. For convenience, the processing of FIG. 3 executed by the in-vehicle apparatus 3 is called an in-vehicle-apparatus-side processing, and the processing of FIG. 4 executed by the portable communication terminal 2 is called a terminal-side processing.

It is noted that a flowchart or the processing of the flowchart in the present application includes sections (also referred to as steps), each of which is represented, for instance, as S101. Further, each section can be divided into several sub-sections while several sections can be combined into a single section. Furthermore, each of thus configured sections can be also referred to as a device, module, or means.

Each or any combination of sections explained in the above can be achieved as (i) a software section in combination with a hardware unit (e.g., computer) or (ii) a hardware section, including or not including a function of a related apparatus; furthermore, the hardware section may be constructed inside of a microcomputer.

Figure 3:
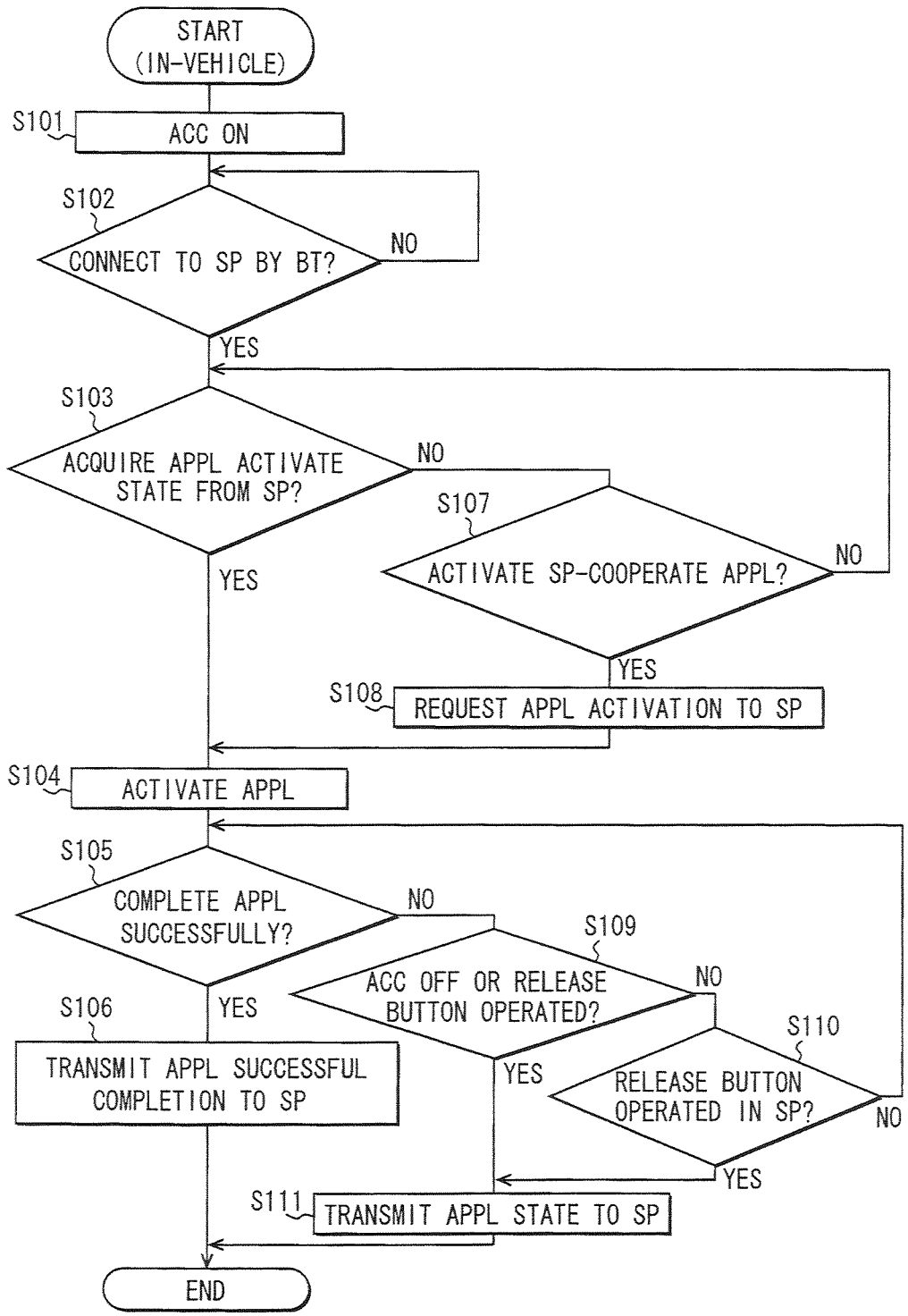
FIG. 3 shows a flow of an in-vehicle-apparatus side process executed by the in-vehicle apparatus.

As shown in the in-vehicle-apparatus-side processing of FIG. 3, when the ACC switch is turned on (S101), the in-vehicle apparatus 3 determines whether the in-vehicle apparatus 3 is connected to the SP (the portable communication terminal 2) by the BT (S102). When the in-vehicle apparatus 3 is not connected to the SP (S102: NO), the determination is repeated until the connection. The portable communication terminal 2 determines whether the portable communication terminal 2 is connected to the in-vehicle apparatus 3 by the BT as shown in the terminal-side processing of FIG. 3 (S201). When the portable communication terminal 2 is not connected to the in-vehicle apparatus 3 (S201: NO), the determination is repeated until the connection.

When the portable communication terminal 2 and the in-vehicle apparatus 3 are placed close to one another to permit communications therebetween by the BT, specifically when the portable communication terminal 2 has been carried into the compartment, the portable communication terminal 2 and the in-vehicle apparatus 3 are communicatively connected to one another by the BT. In this embodiment, the state where the connection has been made by the BT (state where information required for the BT communication has been already registered into both the portable communication terminal 2 and the in-vehicle apparatus 3) is assumed. When the portable communication terminal 2 and the in-vehicle apparatus 3 are in a short range in which the BT communication is possible, the connection by the BT is made without operations by the user.

Figure 4:
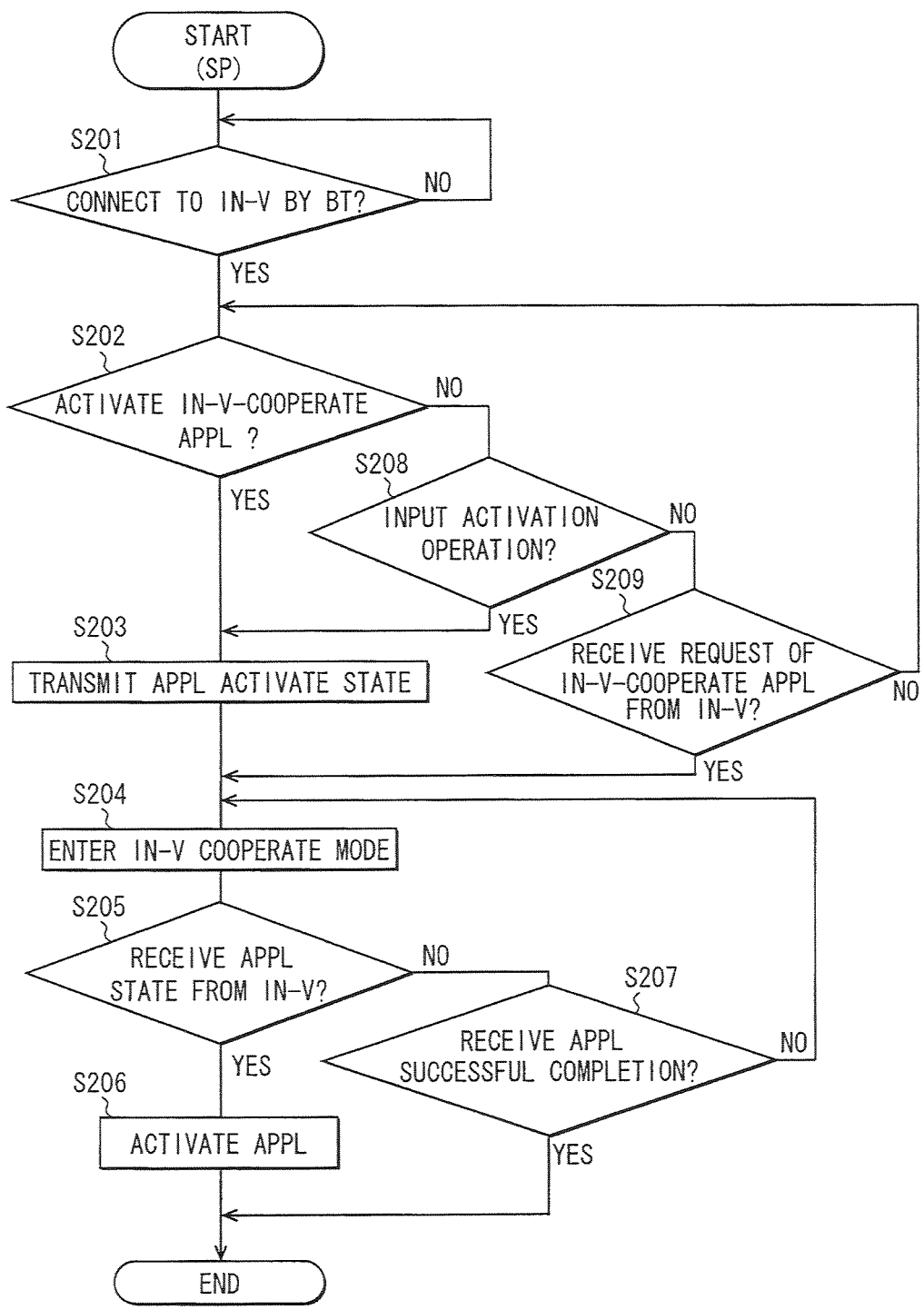
FIG. 4 shows a flow of a terminal side process executed by the portable communication terminal.

When it is determined that the portable communication terminal 2 has been connected to the in-vehicle apparatus 3 by the BT in the terminal-side processing of FIG. 4 (S201: YES), it is determined whether an in-vehicle-apparatus-cooperation application has been activated (S202). The in-vehicle-apparatus cooperation application herein is an application for the portable communication terminal 2 and the in-vehicle apparatus 3 to cooperate or associate with one another. The in-vehicle-apparatus cooperation application has not only a function to cooperate or associate with the in-vehicle apparatus 3 but a function to execute various application programs (e.g., content application A and content application B of FIG. 5) that execute contents. The portable communication terminal 2 transmits the application activation state information to the in-vehicle apparatus 3 (S203) when the in-vehicle-apparatus-cooperation application has been activated (S202: YES). That is, when the portable communication terminal 2 is connected to the in-vehicle apparatus 3 by the BT (S201: YES), the application activation state information can be transmitted from the portable communication terminal 2 to the in-vehicle apparatus 3 (S203) without any operation or instruction of a user. This application activation state information shows whether the in-vehicle-apparatus-cooperation application has been activated in the portable communication terminal 2. Then, the portable communication terminal 2 enters the in-vehicle-apparatus cooperation mode (S204).

On the other hand, when it is determined that the in-vehicle apparatus 3 has been connected to the SP by the BT in the in-vehicle-apparatus-side process of FIG. 3 (S102: YES), it is determined whether the application activation state information of the SP is acquired (S103). As described above, in S203, when the application activation state information is transmitted from the portable communication terminal 2 and acquired (S103: YES), an SP cooperation application is activated (S104). The SP cooperation application has a function to cooperate or associate with the portable communication terminal 2 and a function to execute various application programs (content application A and content application B of FIG. 5) that execute contents.

In this embodiment, when the in-vehicle-apparatus cooperation application and the SP cooperation application are connected by the BT communication, the SPP (Serial Port Profile) is used as a predetermined profile. When the ACC is on, connections of profiles such as not only the SPP but the HFP (Hands-Free Profile) and the PBAP (Phone Book Access Profile) are executed in response to each function. In the BT connection, in addition to SPP, Profiles such as the HFP (Hands-Free Profile), the RFCOMM (Radio Frequency Communication), the AVDTP (Audio/Video Distribution Transport Protocol), the MAP (Message Access Profile), and the PBAP (Phone Book Access Profile) are usable in the BT communication. The SPP can define an arbitrary command and is a profile with high flexibility to allow transmission and reception of various information (data). Therefore, the portable communication terminal 2 and the in-vehicle apparatus 3 of this embodiment use SPP as a profile of the BT communication to transmit and receive various data as execution states of applications.

Figure 5:
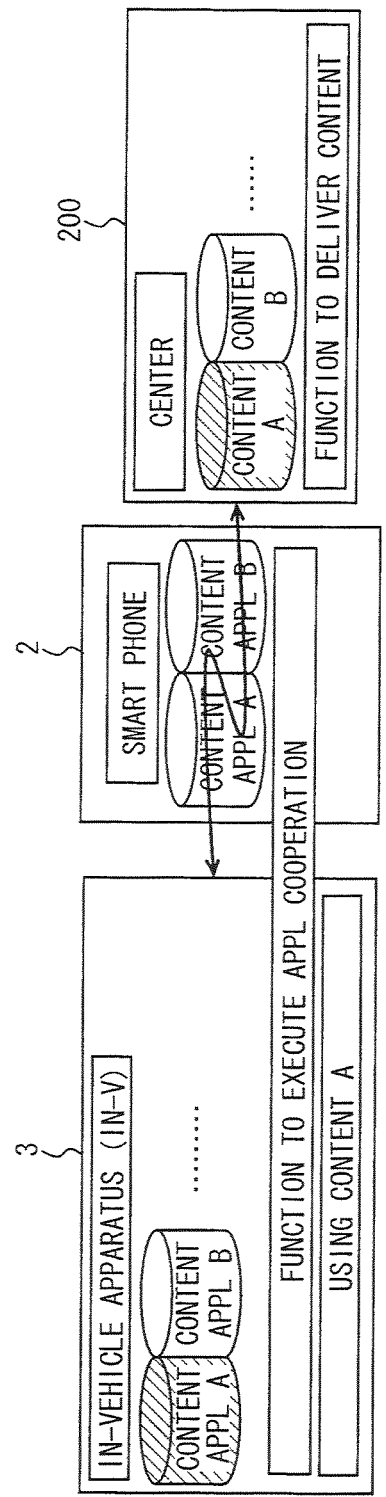
FIG. 5 shows a functional block diagram of the state where the connection between the portable communication terminal and the in-vehicle apparatus is established.

Thus, when the in-vehicle-apparatus-cooperation application is activated in the portable communication terminal 2 and the SP-cooperation application is activated in the in-vehicle apparatus 3 while the portable communication terminal 2 and the in-vehicle apparatus 3 are connected by the BT, the application cooperation function is enabled between the portable communication terminal 2 and the in-vehicle apparatus 3, as shown in FIG. 5. As a result, it becomes possible to execute contents acquired by the portable communication terminal 2 in the in-vehicle apparatus 3. Specifically, when the content A (for example, music content) is delivered by a content delivery function of the center 200, data about the content A is delivered to the in-vehicle apparatus 3 via the portable communication terminal 2. The in-vehicle apparatus 3 activates the content application A that is an application program corresponding to the content A delivered and acquired in the portable communication terminal 2 to execute content A.

Figure 6:
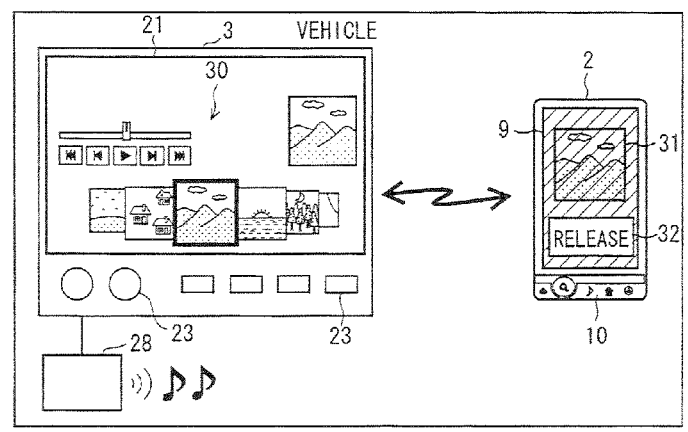
FIG. 6 schematically shows an arrangement in the state where the connection between the portable communication terminal and the in-vehicle apparatus is established.

In this case, the portable communication terminal 2 functions only as a communication medium to deliver the content A, but does not activate the content application A stored in its own storage portion 8. That is, while the portable communication terminal 2 and the in-vehicle apparatus 3 have been connected by the BT communication, the portable communication terminal 2 and the in-vehicle apparatus 3 activate the cooperation application to cooperate or associate with one another, and execute the content acquired by the portable communication terminal 2 in the in-vehicle apparatus 3. For this reason, as shown in FIG. 6, the portable communication terminal 2 is placed in the vehicle having the in-vehicle apparatus 3. Tunes contained in the content A for music delivery are outputted from the speaker 28 coupled to the in-vehicle apparatus 3. An operation menu 30 (execution screen of the content application A) is displayed the display portion 21 of the in-vehicle apparatus 3 to input operations to the content A. The communication network 100 is not illustrated in FIG. 6.

At this time, a content icon 31 to show that the content application A is being executed and a release button 32 to release the BT connection with the in-vehicle apparatus 3 are displayed on the display portion 9 of the portable communication terminal 2. Then, the portable communication terminal 2 enters a tone down state to reduce a brightness of the screen of the display portion 9 and controls part of operations from the key input portion 10. Specifically, in this embodiment, the portable communication terminal 2 enables only the operation of the release button 32 and inhibits operations from other operation keys. For this reason, the user inputs an operation to a content not to the portable communication terminal 2 but to the in-vehicle apparatus 3. That is, while the portable communication terminal 2 and the in-vehicle apparatus 3 have been connected and operations are executable by the in-vehicle apparatus 3, the short-range communication system 1 reduces the risk when the user operates and gazes on the portable communication terminal 2 usually having smaller operation keys and a smaller screen than those of the in-vehicle apparatus 3.

When the in-vehicle-apparatus-cooperation application of the portable communication terminal 2 has not been activated in the terminal-side process shown in FIG. 4 (S202: NO), the portable communication terminal 2 determines whether the in-vehicle-apparatus-cooperation application has been activated, more strictly, whether the user inputs an activation operation (S208). When the in-vehicle-apparatus-cooperation application has been activated (S208: YES), the flow proceeds to S203. When the in-vehicle-apparatus-cooperation application has not been activated (S208: NO) and when the portable communication terminal 2 receives activation request information about the in-vehicle-apparatus-cooperation application from the in-vehicle apparatus 3 (S209: YES), the flow proceeds to S204 after the in-vehicle-apparatus cooperation application is activated. This activation request information is transmitted from the in-vehicle apparatus 3 in the in-vehicle-apparatus-side process shown in FIG. 3. Specifically, when application activation state information of the SP is not received (S103: NO) and when the SP-cooperation application is activated, that is, when the user inputs an activation operation for the SP-cooperation application (S107: YES), the in-vehicle apparatus 3 requests the SP to activate the application (activation request information is transmitted) (S108).

When each cooperation application is activated by such a process, the in-vehicle apparatus 3 executes contents in response to operations by the user. At this time, the in-vehicle apparatus 3 determines whether the SP cooperation application is completed and under what conditions the SP cooperation application is completed. Specifically, the in-vehicle apparatus 3 determines whether the application is successfully completed (S105), whether the ACC switch is off or the release button 32 is operated in the in-vehicle apparatus 3 (S109), and whether the release button 32 is operated in the SP (S110). Here, the successful completion in S105 signifies the state where an operation to complete the SP cooperation application is inputted by the user. That is, the successful completion signifies the state where the user wants to complete the cooperation function between the portable communication terminal 2 and the in-vehicle apparatus 3. The release button of the in-vehicle apparatus 3 is not illustrated, but is allocated to the display portion 21, operation switch 23, etc. of the in-vehicle apparatus 3.

When the application is successfully completed (S105: YES), the in-vehicle apparatus 3 completes the in-vehicle-apparatus cooperation application after transmitting the application successful-completion information to the SP (S106). On the other hand, the portable communication terminal 2 determines in the terminal side process of FIG. 4 whether the application state information has been received (S205) and whether the application successful-completion information has been received (S207). The portable communication terminal 2 completes the in-vehicle apparatus cooperation application when the application successful-completion information has been transmitted from the in-vehicle apparatus 3 as described above (S207: YES). In this case, since the user determines to complete the cooperation function, the in-vehicle-apparatus cooperation application is completed in the portable communication terminal 2 without change.

On the other hand, when the ACC is turned off in the in-vehicle-apparatus side process of FIG. 3 or when the release button is operated (S109: YES), and when the release button 32 is operated in the SP (S110: YES), the in-vehicle apparatus 3 completes the SP cooperation application after transmitting the application state information to the SP (S111). This application state information is information to report an application execution state including (i) a type of an application being executed at a current time, (ii) a type of a content being executed, and (iii) an execution state of the content being executed, as described above. The application state information includes the following information, for example.

(i) Type of Application: A type of an application program executed to execute a content in response to a type of this content. For example, a tune play application program is executed for a music content, a Web browser is executed for a Web content, a video play application program is executed for a video content, and a keyword input and display application program is executed for a retrieval service.

(ii) Type of Content: For example, identification information about tunes (which tune, name of an artist, name of an album, etc.) for a music content, URLs for a web content, and which station (channel) is selected for the so-called Internet radio can be considered.

(iii) Execution State of Content: In case of a music content, its execution state may include whether a tune is being played or stopped, at which position a tune is played, and an input state and display state of a keyword for a retrieval service.

That is, when the connection between the in-vehicle apparatus 3 and the portable communication terminal 2 is released (S109: YES or S110: YES), the in-vehicle apparatus 3 transmits an application state information including an execution state of its own content to the portable communication terminal 2. In the terminal side process of FIG. 4, when the portable communication terminal 2 receives application state information transmitted from the in-vehicle apparatus 3 (S205: YES), the portable communication terminal 2 activates the corresponding application on the basis of the application state information (S206). When the ACC is turned off, all the profiles including not only the SPP but the HFP and PBAP are released. On the other hand, when the release button 32 is operated, the SPP is released and the connections of the HFP and of the PBAP are maintained.

Figure 7:
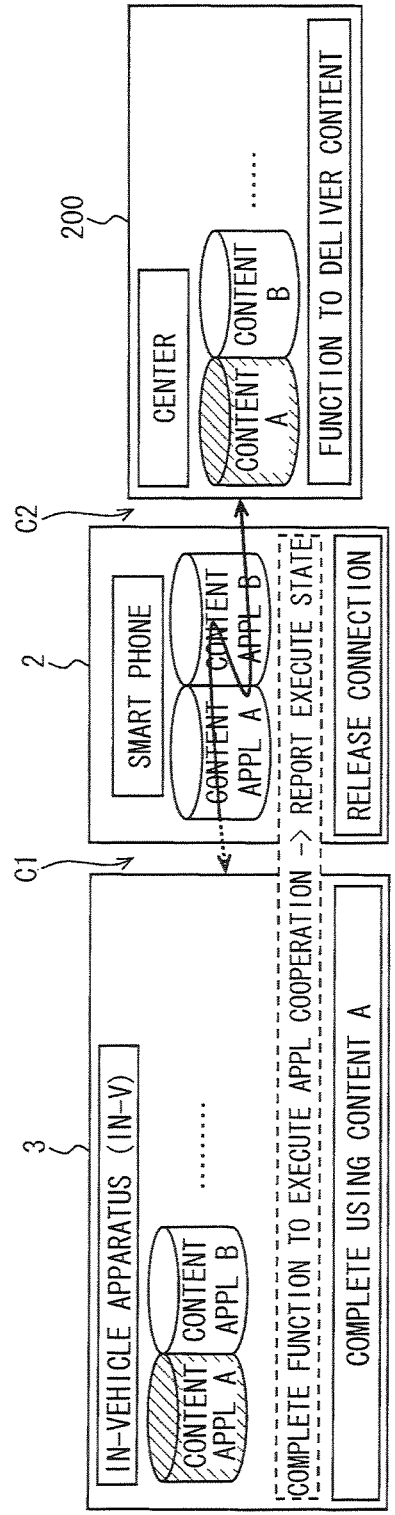
FIG. 7 is a functional block diagram showing the state where the connection between the portable communication terminal and the in-vehicle apparatus is released.

Thus, when the application cooperation function is completed, a type of an application (for example, the content application A) being executed and its execution state are transmitted between the portable communication terminal 2 and the in-vehicle apparatus 3, as shown in FIG. 7. By the way, the portable communication terminal 2 is connected to the in-vehicle apparatus 3 by a communication path C1 of the BT, and to the center 200 by a communication path C2 of the telephony portion 5. As described above, even when the communication path C1 between the portable communication terminal 2 and the in-vehicle apparatus 3 is released, the connection to the center 200 by the communication path C2 is maintained. For this reason, even when the application cooperation function with the in-vehicle apparatus 3 is completed, the portable communication terminal 2 can still use contents delivered from the center 200.

Figure 8:
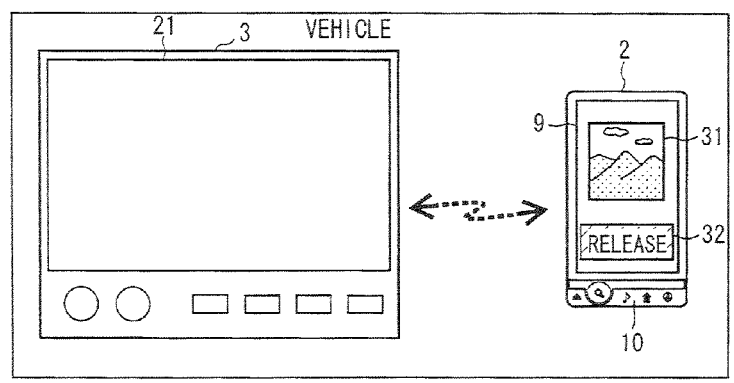
FIG. 8 schematically shows an arrangement in the state where the connection between the portable communication terminal and the in-vehicle apparatus is released.

As shown in FIG. 8, while the connection between the portable communication terminal 2 and the in-vehicle apparatus 3 has been released, the portable communication terminal 2 activates an application (for example, the content application A) stored in the storage portion 8 thereof on the basis of application state information transmitted from the in-vehicle apparatus 3 before the disconnection. The tone down state of the screen is released and all operations of the key input portion 10 are enabled. The state where the release button 32 is operated is shown in FIG. 8 by hatching. Also when the ACC switch is turned off, the substantially common process is executed. In this case, the screen of the in-vehicle apparatus 3 may display the release.

Figure 9:
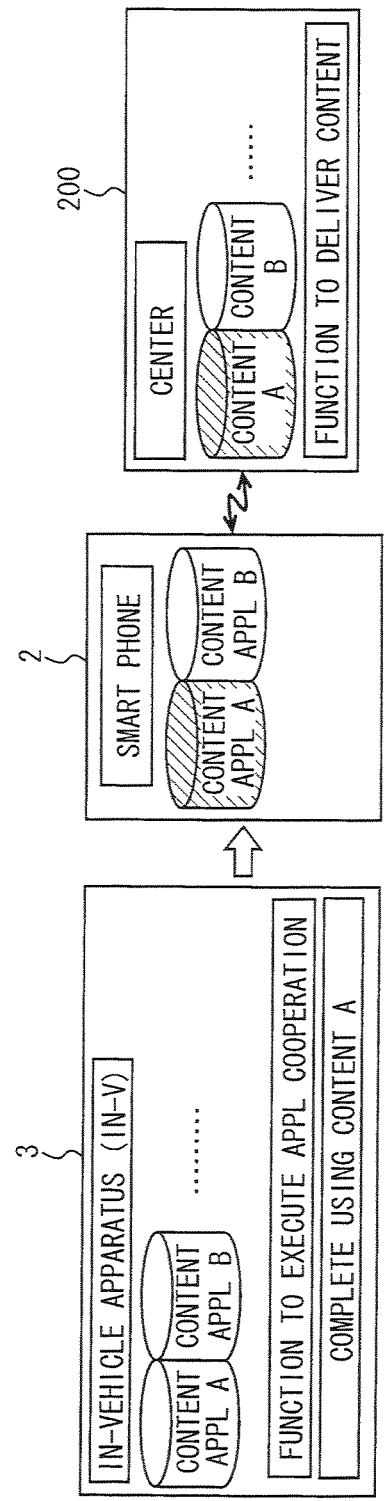
FIG. 9 is a functional block diagram showing the state after the connection between the portable communication terminal and the in-vehicle apparatus is released.
Figure 10:
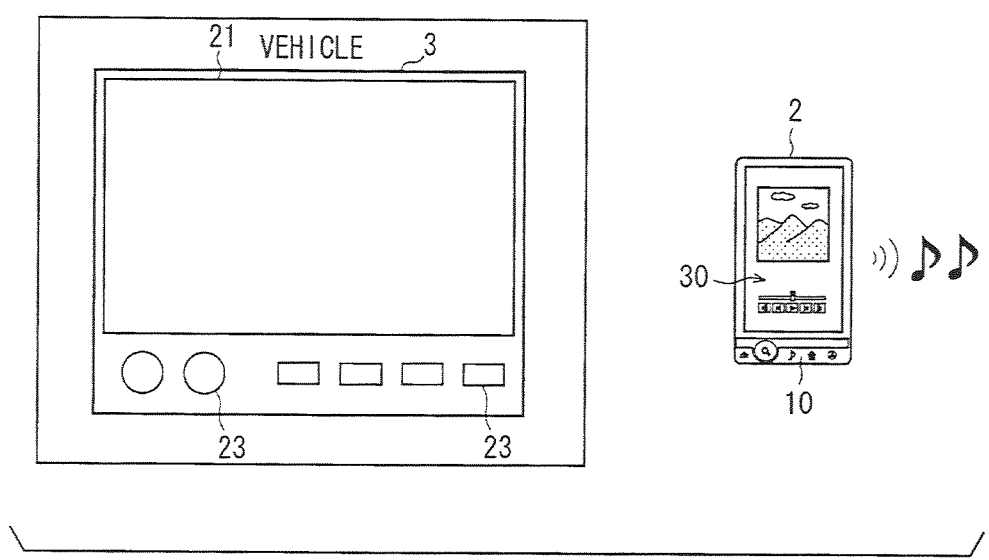
FIG. 10 schematically shows an arrangement after the connection between the portable communication terminal and the in-vehicle apparatus is released.

Then, as shown in FIG. 9, the entity that executes contents shifts from the in-vehicle apparatus 3 to the portable communication terminal 2, and the execution of the content A delivered from the center 200 is continued by the content application A stored in the portable communication terminal 2. For this reason, as shown in FIG. 10, even when the portable communication terminal 2 is carried out of the vehicle, the content A can be executed. In this case, tunes contained in the content A which is a music content are outputted from the speaker 12 of the portable communication terminal 2, and the display portion 9 thereof displays the operation menu 30 to input operations to the content A. Thus, in the short-range communication system 1, when the connection between the portable communication terminal 2 and the in-vehicle apparatus 3 is released while a content in the in-vehicle apparatus 3 is being executed, an execution state of an application before the release is transmitted from the in-vehicle apparatus 3 to the portable communication terminal 2. After the release, the portable communication terminal 2 takes over the execution state to continue the execution of the content.

As explained above, in the short-range communication system 1 of this embodiment, when the connection between the portable communication terminal 2 and the in-vehicle apparatus 3 is released by the user during the execution of a content in the in-vehicle apparatus 3, the portable communication terminal 2 takes over the application execution state in the in-vehicle apparatus 3 and continues the execution of the content. Therefore, even when the user gets out of the vehicle to release the connection by the short-range communication between the portable communication terminal 2 and in-vehicle apparatus 3, the portable communication terminal 2 takes over an execution state of a content executed in the in-vehicle apparatus 3 and can continue the execution of the content. In this case, the user does not need to reboot an application that executes the content in the portable communication terminal 2 or to acquire the content again. Therefore, the convenience can be improved.

The in-vehicle apparatus 3 transmits its own application execution state to the portable communication terminal 2 when the connection to the portable communication terminal 2 is released. Accordingly, when a content acquired by the portable communication terminal 2 as a communication medium is executed, the portable communication terminal 2 does not need to store the execution state of the content therein. Therefore, the power consumption of the portable communication terminal 2 can be reduced.

When the connection between the portable communication terminal 2 and the in-vehicle apparatus 3 (the connection by the communication path C1) is released while the portable communication terminal 2 is connected to the center 200 via the communication network 100 to acquire contents continuously, the portable communication terminal 2 takes over the application execution state of the in-vehicle apparatus 3 while the connection to the communication network 100 (the connection by the communication path C1) continues. As a result, even when the connection between the portable communication terminal 2 and the in-vehicle apparatus 3 is released, the portable communication terminal 2 can acquire contents continuously. Therefore, even when a content delivered by streaming, such as an Internet radio and a music delivery, is viewed and listened, an execution state thereof can be continued without stopping the content.

The portable communication terminal 2 and the in-vehicle apparatus 3 communicate application execution states with one another by using the SPP as a profile of the BT communication. The SPP can define arbitrary commands and has a high degree of freedom to permit transmit and receive various information (data) efficiently. Additionally, because of the connection by the BT, the portable communication terminal 2 and the in-vehicle apparatus 3 can be connected by the short-range radio communication, providing improved convenience. In this embodiment, the SPP is used. Any profile that can transmit and receive, e.g., arbitrary commands to execute the in-vehicle apparatus cooperation applications and the SP cooperation applications associatively may be used.

(Second Embodiment)

Figure 11:
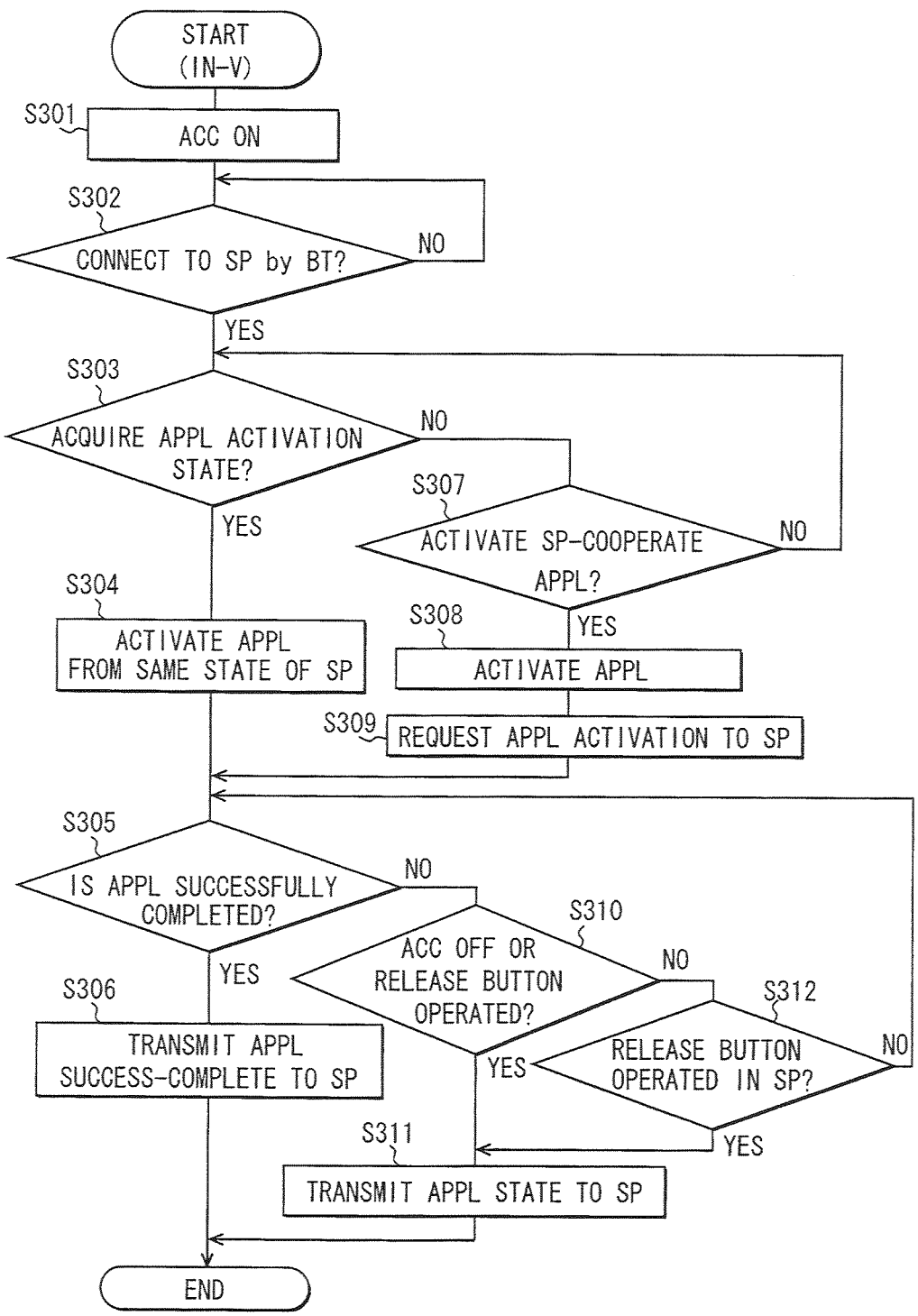
FIG. 11 shows a flow of an in-vehicle-apparatus side process according to a second embodiment of the present disclosure.

A short-range communication system of the second embodiment is hereafter explained in reference to FIG. 11. The second embodiment is different from the first embodiment in that contents are executed in the portable communication terminal before the user gets on the vehicle. Since the structures of the in-vehicle apparatus and the portable communication terminal are common to those in the first embodiment, their details are not explained. The terminal side process, which is common to the process in the first embodiment, is explained also in reference to FIG. 4. The execution of generally common processes to the processes of the first embodiment in the in-vehicle-apparatus side process shown in FIG. 11 are not explained in detail.

When the user gets on the vehicle while a content is being executed in the portable communication terminal 2 in the in-vehicle-apparatus side process shown in FIG. 11 to turn on the ACC switch (S301), the in-vehicle apparatus 3 determines whether the in-vehicle apparatus 3 has been connected to the SP by the BT (S302). When the in-vehicle apparatus 3 has been connected to the SP (S302: YES), the in-vehicle apparatus 3 acquires application activation state information of the SP (S302). This application activation state information is transmitted from the portable communication terminal 2 in which the in-vehicle-apparatus cooperation application has been activated (S202: YES, S203) when the BT connection to the in-vehicle apparatus 3 is made in the terminal side process of FIG. 4 (S201: YES). In this case, the portable communication terminal 2 enters an in-vehicle apparatus cooperation mode (S204) when the application activation state information is transmitted.

When the in-vehicle apparatus 3 acquires the application activation state information of the SP in the in-vehicle side process of FIG. 11 (S303), the in-vehicle apparatus 3 activates an application that, on the basis of the acquired application activation information, can execute the corresponding content in the same state as shown by the acquired application activation state information (S304). Accordingly, the application execution state of the portable communication terminal 2 is taken over by the in-vehicle apparatus 3, and after that, the content is executed in the in-vehicle apparatus 3. Then, S205 to S207 are executed in the portable communication terminal 2, and S305 to S306 and S310 to S312 are executed in the in-vehicle apparatus 3. Accordingly, as in the first embodiment, when the connection therebetween is released, the application execution state in the in-vehicle apparatus 3 is taken over and executed by the portable communication terminal 2. As a result, the user can continue using, in the in-vehicle apparatus 3, the content executed in the portable communication terminal 2 without operating the portable communication terminal 2 and the in-vehicle apparatus 3.

By the way, the application activation state information transmitted from the portable communication terminal 2 at S302 may contain contents currently executed in the portable communication terminal 2 and types of applications currently executing the contents. In this case, in addition to whether the in-vehicle-apparatus cooperation application has been activated, whether a content being executed in the portable communication terminal 2 can cooperate or associate with the in-vehicle apparatus 3 is transmitted. In the state where the in-vehicle apparatus 3 has not acquired the application activation state information of the SP in S303 (S303: NO), when the user activates an SP cooperation application in the in-vehicle apparatus 3 (S307: YES), the in-vehicle apparatus 3 transmits an application activation request to the SP (S309) after activating the SP cooperation application (S308).

The portable communication terminal 2 that has received the application activation request (S209: YES) while the in-vehicle-apparatus cooperation application has not been activated (S202: NO and S208: NO) enters the in-vehicle apparatus cooperation mode after activating the in-vehicle-apparatus cooperation application (S204). As a result, while an application program to execute a content has been activated without activation of the in-vehicle-apparatus cooperation application, more specifically while an application program for a content executable from the in-vehicle-apparatus cooperation application and the SP cooperation application has been activated independently, the in-vehicle apparatus 3 can take over the application execution state to execute the content when the content can cooperate or associate with the in-vehicle apparatus 3, providing improved convenience.

As explained above, when the connection between the in-vehicle apparatus 3 and the portable communication terminal 2 is established while a content is being executed in the portable communication terminal 2, the in-vehicle apparatus 3 takes over the application execution state included in the application activation state information transmitted from the portable communication terminal 2, and executes the content by itself. Accordingly, for example, when the user who is executing a content in the portable communication terminal 2 gets on the vehicle, the content continues to be executed in the in-vehicle apparatus 3 even when operations to the content are not inputted by the user. The portable communication terminal 2 transmits its own application execution state to the in-vehicle apparatus 3 when the portable communication terminal 2 is connected to the in-vehicle apparatus 3. Accordingly, when the portable communication terminal 2 and the in-vehicle apparatus 3 are connected, the application execution state is immediately transmitted to the in-vehicle apparatus 3. Therefore, the convenience can be improved.

(Another Embodiment)

The present disclosure is not limited to the above-mentioned embodiments. The following modifications and expansions are possible. In the first embodiment, the in-vehicle apparatus 3 transmits its application execution state when the connection to the portable communication terminal 2 is released. The application execution state may be transmitted each predetermined time. In this case, the portable communication terminal 2 can recognize the application execution state in the in-vehicle apparatus 3 periodically. As a result, for example, when the user gets out of the vehicle while the portable communication terminal 2 remains connected to the in-vehicle apparatus 3 (without completion of each cooperation application), a content can be executed continuously on the basis of, e.g., the latest of the periodically transmitted application execution states even when the short-range communication between the portable communication terminal 2 and the in-vehicle apparatus 3 is released regardless of the intension of the user.

Each embodiment shows the example using a smart phone as the portable communication terminal 2, but the portable communication terminal 2 may use the so-called mobile phone. The portable communication terminal 2 and the in-vehicle apparatus 3 are connected by the BT communication in each embodiment, but may be connected by the USB. That is, the portable communication terminal 2 and USB modules 7 and 17 of the in-vehicle apparatus 3 may form a notification device or means. Of course, only the USB or both the BT and USB may be used as the notification device.

The example in which contents are received from the telephony portion 5 via the communication network 100 has been shown. For example, contents may be acquired by the so-called wireless LAN and WiMAX (Worldwide Interoperability for Microwave Access). The type of a content, the screen display, the type of an application programs, and its execution state shown in each embodiment are each one example. Other examples are possible. The contents may be not only delivered by streaming but downloaded to be stored in the portable communication terminal 2 after the acquisition thereof or may be stored in the portable communication terminal 2 without the communication network 100.

In the above example, the in-vehicle apparatus 3 as the vehicular apparatus uses, but is not limited to, a navigation apparatus.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A short-range communication system comprising:
   a portable communication terminal including a content execution section to execute a content; and
   an in-vehicle apparatus including a content execution section to execute a content, the in-vehicle apparatus communicatively connected to the portable communication terminal,
   the content execution section of the in-vehicle apparatus executing a content in cooperation with the portable communication terminal in a state where connection between the portable communication terminal and the in-vehicle apparatus is established,
   the in-vehicle apparatus further including:
   a notification device that transmits an application execution state in the content execution section of the in-vehicle apparatus, to the portable communication terminal,
   wherein:
   in cases that the connection between the portable communication terminal and the in-vehicle apparatus is released by an operation of a user that is input directly into the portable communication terminal during execution of the content in the content execution section of the in-vehicle apparatus, the content execution section of the portable communication terminal starts execution of the content by taking over the application execution state in the in-vehicle apparatus, the application execution state being transmitted from the notification device of the in-vehicle apparatus.

2. The short-range communication system according to claim 1 wherein:
   the portable communication terminal further includes a content acquisition device that acquires a content from an external center via a communication network; and
   in cases that the connection with the in-vehicle apparatus is released in a state to continuously acquire the content from the external center, the portable communication terminal takes over the application execution state in the in-vehicle apparatus while maintaining the state where the portable communication terminal is connected to the external center via the external communication network.

3. The short-range communication system according to claim 1, wherein:
   when the connection to the portable communication terminal is released, the in-vehicle apparatus transmits the application execution state in the content execution section of the in-vehicle apparatus to the portable communication terminal.

4. The short-range communication system according to claim 1, wherein:
   the in-vehicle apparatus transmits the application execution state in the content execution section of the in-vehicle apparatus to the portable communication terminal with predetermined notification time intervals.

5. The short-range communication system according to claim 1, wherein:
   the portable communication terminal further includes a notification device that transmits an application execution state in the content execution section of the portable communication terminal, to the in-vehicle apparatus,
   when the connection to the portable communication terminal is established in a state where the content is being executed by the content execution section of the portable communication terminal, the in-vehicle apparatus executes the content by taking over the application execution state in the portable communication terminal which is transmitted from the notification device of the portable communication terminal.

6. The short-range communication system according to claim 1, wherein:
   each of the content execution section of the portable communication terminal and the content execution section of the in-vehicle apparatus is an application that is executable in cooperation by the portable communication terminal and the in-vehicle apparatus in a state where the connection between the portable terminal and the in-vehicle apparatus is established using a predetermined profile of Bluetooth communication; and
   the portable communication terminal executes the content by taking over the application execution state in the in-vehicle apparatus which is transmitted from the notification device of the in-vehicle apparatus, when the connection by the predetermined profile is released.

7. An in-vehicle apparatus communicatively connected to a portable communication terminal,
   the portable communication terminal having a content execution section that executes a content;
   the in-vehicle apparatus comprising:
   a content execution section to execute a content,
   the content execution section of the in-vehicle apparatus executing a content in cooperation with the portable communication terminal in a state where connection between the portable communication terminal and the in-vehicle apparatus is established,
   the in-vehicle apparatus further including:
   a notification device that transmits an application execution state in the content execution section of the in-vehicle apparatus, to the portable communication terminal, wherein:

in cases that the connection between the portable communication terminal and the in-vehicle apparatus is released by an operation of a user that is input directly into the portable communication terminal during execution of the content in the content execution section of the in-vehicle apparatus, the content execution section of the portable communication terminal starts execution of the content by taking over the application execution state in the in-vehicle apparatus, the application execution state being transmitted from the notification device of the in-vehicle apparatus.

8. A portable communication terminal communicatively connected to an in-vehicle apparatus, the in-vehicle apparatus having
(i) a content execution section that executes a content and
(ii) a notification device that transmits an application execution state in the content execution section,
the portable communication terminal comprising:
a content execution section that executes a content,
when connection between the portable communication terminal and the in-vehicle apparatus is released by an operation of a user that is input directly into the portable communication terminal in a state where a content is being executed in the in-vehicle apparatus,
the content execution section of the portable communication terminal starts execution of the content by taking over an application execution state in the in-vehicle apparatus which is transmitted from the notification device of the in-vehicle apparatus.

9. The short-range communication system according to claim 1, wherein:
the application execution state transmitted by the notification device includes (i) a type of an application executing the content at a current time, (ii) a type of the content being executed, and (iii) an execution state of the content being executed.

10. The short-range communication system according to claim wherein:
the portable communication terminal further includes a content acquisition device that acquires the content from an external center via a communication network; and
in the state where connection between the portable communication terminal and the in-vehicle apparatus is established, the content execution section of the in-vehicle apparatus is executing the content that is continuously acquired from the external center by the content acquisition device of the portable communication terminal serving as a communication medium between the in-vehicle apparatus and the external center.

11. The portable communication terminal according to claim 8, wherein:
the application execution state transmitted by the notification device includes (i) a type of an application executing the content at a current time, (ii) a type of the content being executed, and (iii) an execution state of the content being executed.

12. The portable communication terminal according to claim 8, wherein:
the content acquisition section acquires the content from an external center via a communication network; and
in the state where connection between the portable communication terminal and the in-vehicle apparatus is established, the content execution section of the in-vehicle apparatus is executing the content that is continuously acquired from the external center by the content acquisition section of the portable communication terminal serving as a communication medium between the in-vehicle apparatus and the external center.

13. The in-vehicle apparatus according to claim 7, wherein:
the application execution state transmitted by the notification device includes (i) a type of an application executing the content at a current time, (ii) a type of the content being executed, and (iii) an execution state of the content being executed.

14. The in-vehicle apparatus according to claim 7, wherein:
the portable communication terminal further includes a content acquisition device that acquires the content from an external center via a communication network; and
in the state where connection between the portable communication terminal and the in-vehicle apparatus is established, the content execution section of the in-vehicle apparatus is executing the content that is continuously acquired from the external center by the content acquisition device of the portable communication terminal serving as a communication medium between the in-vehicle apparatus and the external center.

\* \* \* \* \*